(12) United States Patent
Yu et al.

(10) Patent No.: US 11,790,903 B2
(45) Date of Patent: Oct. 17, 2023

(54) VOICE RECOGNITION METHOD AND DEVICE

(71) Applicant: LG ELECTRONICS INC., Seoul (KR)

(72) Inventors: Hyun Yu, Seoul (KR); Byeongha Kim, Seoul (KR); Yejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 475 days.

(21) Appl. No.: 16/869,107

(22) Filed: May 7, 2020

(65) Prior Publication Data

US 2021/0125611 A1 Apr. 29, 2021

(30) Foreign Application Priority Data

Oct. 29, 2019 (KR) .................. 10-2019-0135478

(51) Int. Cl.
*G10L 15/22* (2006.01)
*G10L 15/197* (2013.01)

(52) U.S. Cl.
CPC .......... *G10L 15/22* (2013.01); *G10L 15/197* (2013.01); *G10L 2015/223* (2013.01)

(58) Field of Classification Search
CPC .............. G10L 15/22; G10L 15/197; G10L 2015/223; G10L 15/1822; G10L 25/78; G10L 15/02; G10L 17/24; G10L 2015/221; G06F 40/30
USPC ........................................................ 704/275
See application file for complete search history.

(56) References Cited

U.S. PATENT DOCUMENTS

| | | | |
|---|---|---|---|
| 9,437,186 B1* | 9/2016 | Liu | G10L 15/22 |
| 11,003,839 B1* | 5/2021 | Hatch | G06F 3/04886 |
| 11,062,696 B2* | 7/2021 | Tadpatrikar | G10L 15/065 |
| 2003/0074195 A1* | 4/2003 | Bartosik | G10L 15/22 704/E15.04 |
| 2005/0080625 A1* | 4/2005 | Bennett | G10L 15/183 704/E15.047 |
| 2005/0267759 A1* | 12/2005 | Jeschke | G10L 15/22 704/E15.04 |
| 2007/0078642 A1* | 4/2007 | Weng | G10L 15/19 704/4 |
| 2014/0012580 A1* | 1/2014 | Ganong, III | G10L 15/1815 704/E15.018 |
| 2014/0039895 A1* | 2/2014 | Aravamudan | G10L 15/1822 704/257 |
| 2014/0058732 A1* | 2/2014 | Labsky | G10L 15/30 704/E15.005 |

(Continued)

*Primary Examiner* — Thuykhanh Le
(74) *Attorney, Agent, or Firm* — Birch, Stewart, Kolasch & Birch, LLP

(57) ABSTRACT

Disclosed is a voice recognition device and method. According to the disclosure, the voice recognition device, upon failing to grasp the intent of the user's utterance from the original utterance which is divided into a head utterance and a tail utterance, figures out the intent from the head utterance to thereby complete the original utterance and provides the result of voice recognition processing on the original utterance. According to an embodiment, the voice recognition device may be related to artificial intelligence (AI) modules, robots, augmented reality (AR) devices, virtual reality (VR) devices, and 5G service-related devices.

22 Claims, 11 Drawing Sheets

(56) References Cited

U.S. PATENT DOCUMENTS

| | | | |
|---|---|---|---|
| 2014/0140497 A1* | 5/2014 | Ripa | H04M 3/5175 |
| | | | 379/265.06 |
| 2015/0206544 A1* | 7/2015 | Carter | G10L 15/04 |
| | | | 704/235 |
| 2015/0261496 A1* | 9/2015 | Faaborg | G10L 15/00 |
| | | | 715/728 |
| 2015/0348551 A1* | 12/2015 | Gruber | G10L 15/1822 |
| | | | 704/235 |
| 2015/0382047 A1* | 12/2015 | Van Os | G10L 15/26 |
| | | | 725/38 |
| 2016/0104486 A1* | 4/2016 | Penilla | G10L 15/02 |
| | | | 704/232 |
| 2016/0379627 A1* | 12/2016 | Yassa | G10L 25/78 |
| | | | 704/255 |
| 2017/0075879 A1* | 3/2017 | Sakamoto | G10L 15/26 |
| 2018/0068660 A1* | 3/2018 | Kawahara | G10L 15/26 |
| 2018/0240459 A1* | 8/2018 | Weng | G06N 5/02 |
| 2019/0051289 A1* | 2/2019 | Yoneda | G06F 3/167 |
| 2019/0180741 A1* | 6/2019 | Park | G10L 15/10 |
| 2019/0206397 A1* | 7/2019 | Zhou | G10L 15/26 |
| 2019/0378493 A1* | 12/2019 | Kim | G10L 15/05 |
| 2020/0273448 A1* | 8/2020 | Min | G06N 3/044 |
| 2020/0302112 A1* | 9/2020 | Helm | G10L 15/08 |
| 2021/0104236 A1* | 4/2021 | Doggett | G10L 15/1822 |
| 2021/0280180 A1* | 9/2021 | Skobeltsyn | G10L 15/18 |

* cited by examiner

VOICE RECOGNITION METHOD AND DEVICE

CROSS-REFERENCE TO RELATED APPLICATION(S)

This application is based on and claims priority under 35 U.S.C. 119 to Korean Patent Application No. 10-2019-0135478, filed on Oct. 29, 2019, in the Korean Intellectual Property Office, the disclosure of which is herein incorporated by reference in its entirety.

TECHNICAL FIELD

The disclosure relates to a voice recognition method and a voice recognition device.

DESCRIPTION OF RELATED ART

As technology advances, various voice recognition devices and services have recently debuted in a diversity of industry sectors. Voice recognition technology may be a series of processes that convert people's voice into computer-executable commands to be understood by devices. Voice recognition-adopted services encompass several processes in which devices recognize people's voice and provide an adequate service.

A voice recognition-equipped device may be controlled or manipulated by the user's complete utterances. The user may sometimes fail to think of the right words to complete an utterance, ending up with a silent delay or uttering an filled pause. In other words, the user may stumble over her words or try to search for the adequate words via other means or route.

In this case, the voice recognition device may recognize the user's utterance as complete although it is not indeed. Resultantly, the voice recognition device processes the incomplete utterance and gives a wrong result.

According to a conventional way proposed to address such issues, the user's utterance is divided into a head utterance and a tail utterance with respect to the delay or filled pause, and the head utterance and tail utterance are merged together, with the delay or filled pause left out, thereby completing the user's utterance.

However, this conventional method simply combines the head utterance and tail utterance in order and, if the head and tail utterances contain the same word or information, the device may fail to precisely recognize the user's utterance due to the duplicate words or information.

In the hypothesis that the head utterance "in the TV show Iris," and the tail utterance is "Let me know Taehee KIM's role in the TV show Iris," the device may erroneously recognize the user's utterance as "Let me know Taehee KIM's role in the TV show Iris in the TV show Iris."

SUMMARY

The disclosure aims to address the foregoing issues and/or needs.

According to the disclosure, the voice recognition device and method aims to address the issue that the user's utterance is wrong recognized as complete although it is indeed incomplete due to a delay or filled pause.

According to the disclosure, there is provided a voice recognition device that takes a delay or filled pause in the user's utterance as a pause of the original utterance and keeps the voice recognition function in active mode.

According to the disclosure, there is provided a voice recognition device and method that provides the results of voice recognition processing on both the original utterance and an additional utterance upon receiving the additional utterance for obtaining any information while receiving the original utterance.

According to the disclosure, there is provided a voice recognition device and method that divides the original utterance that has been stopped from being issued into a head utterance and a tail utterance by receiving an additional utterance and avoid duplicate recognition on the same words or information included in the head utterance and tail utterance.

According to the disclosure, there is provided a voice recognition device and method that, upon failing to grasp the intent of the user's utterance from the head utterance of the original utterance which has been divided into the head and tail utterances, extracts information by which the intent may be figured out from the head utterance.

According to an embodiment, a method of voice recognition comprises determining whether to temporary pause reception of a first utterance while receiving the first utterance, outputting a result of voice recognition processing on a second utterance received after the temporary pause, determining an intent of a third utterance received after outputting the result of voice recognition processing on the second utterance, and generating a user voice command based on the intent of the third utterance and the first utterance and outputting a result of voice recognition processing on the user voice command.

Determining the intent of the third utterance may include extracting an name entity and first information related to the intent of the third utterance from the third utterance and inserting the name entity and the first information to slots included in an intent classification table, wherein the slots may be associated with a plurality of intent items included in the intent classification table.

The method may further comprise determining whether there is an intent item in which a minimum number of slots for determining an intent have been filled among the intent items.

Determining whether there is the intent item in which the minimum number of slots have been filled may include, if there is no intent item in which the minimum number of slots have been filled, extracting the name entity and second information related to an intent of the first utterance from the first utterance, and inserting the name entity and the second information to the slots included in the intent classification table.

Extracting the name entity and the second information related to the intent of the first utterance may include, upon failing to extract the name entity and the second information from the first utterance, requesting a user to provide the name entity and the second information.

Determining whether there is the intent item in which the minimum number of slots have been filled may include, if there is at least one intent item in which the minimum number of slots have been filled, determining the intent item in which the minimum number of slots have been filled as the intent of the third utterance.

Determining whether to temporary pause reception of the first utterance may include determining whether the first utterance includes a filled pause which is a non-linguistical element, if the filled pause is included in the first utterance, recognizing the filled pause as a temporary pause signal for reception of the first utterance, and temporarily pausing reception of the first utterance.

Determining whether the first utterance includes the filled pause may include recognizing one or more words from the first utterance and performing comparison as to whether the words are identical or similar to words in a pre-owned filled pause dictionary.

Determining whether to temporary pause reception of the first utterance may include, when a silent delay occurs during a preset time while receiving the first utterance, temporarily pausing reception of the first utterance.

Determining whether to temporary pause reception of the first utterance may include determining whether the first utterance includes a preset temporary pause determination-purpose keyword and if the temporary pause determination-purpose keyword is included in the first utterance, temporarily pausing reception of the first utterance.

Determining whether to temporary pause reception of the first utterance may include, if reception of the first utterance is temporarily paused, waiting for voice recognition processing on the first utterance received before the temporary pause.

The method may further comprise receiving a wakeup word before receiving the first utterance and initiating a voice recognition active state.

According to an embodiment, a voice recognition device comprises a first processing unit determining whether to temporary pause reception of a first utterance while receiving the first utterance, a second processing unit outputting a result of voice recognition processing on a second utterance received after the temporary pause, an name entity recognition unit capable of extracting an name entity from a third utterance received after outputting the result of voice recognition processing on the second utterance and the first utterance, an intent classifying unit determining a common intent for the first utterance and the third utterance, and a dialog management unit generating a user voice command based on the common intent and outputting a result of voice recognition processing on the user voice command, wherein the intent classifying unit may include an intent classification table including a plurality of items and slots associated with the plurality of items.

The first processing unit, if the first utterance includes a filled pause which is a non-linguistical element, may recognize the filled pause as a signal for temporarily pausing reception of the first utterance and temporarily pause reception of the first utterance.

The voice recognition device may further comprise a pre-processing unit receiving a wakeup word before receiving the first utterance and switching the voice recognition device into an active mode.

The second processing unit, after outputting the result of voice recognition processing on the second utterance, may maintain the active mode of the voice recognition device.

The name entity recognition unit may extract the name entity first from the third utterance and, upon failing to extract the name entity from the third utterance, extract the name entity from the first utterance.

The intent classifying unit may insert at least one or more of the name entity extracted by the name entity recognition unit, first information for an intent of the third utterance and second information for an intent of the first utterance to the slots, and if the first information, of the first information and the second information, is present, the first information may be inserted to the slots and, if the first information is absent, the second information may be inserted to the slots.

The first processing unit may recognize one or more words from the first utterance, compare the words with words in a pre-owned filled pause dictionary, and if the words are identical or similar to the words in the filled pause dictionary, reception of the first utterance may be temporarily paused.

The first processing unit, when a silent delay occurs during a preset time while receiving the first utterance, may temporarily pause reception of the first utterance.

The first processing unit, when a preset temporary pause determination-purpose keyword is included in the first utterance, may temporarily pause reception of the first utterance.

The first processing unit, if reception of the first utterance is temporarily paused, may wait for voice recognition processing on the first utterance received before the temporary pause.

According to the disclosure, the voice recognition device and method may recognize a delay or filled pause, which occurs while receiving an uttered voice, as an incomplete utterance, temporarily store the same, maintain the voice recognition function in the active state, and provide the result of voice recognition processing on an additional uttered voice received after the delay or filled pause utterance. The voice recognition device and method may merge the original uttered voice reentered with the pre-delay or pre-filled pause original uttered voice and recognize the result as a complete utterance, and provide the result of voice recognition processing on the original utterance, thereby providing enhanced voice recognition accuracy.

According to the disclosure, the voice recognition device and method may distinguish between a temporary pause of utterance and completion of utterance, thereby delivering a better performance of voice recognition processing on utterances.

According to the disclosure, a voice recognition device and method may provide the results of voice recognition processing on both the original utterance and an additional utterance, with the voice recognition function activated, even when receiving the additional utterance for obtaining any information while receiving the original utterance.

According to the disclosure, the voice recognition device and method may figure out per-user utterance patterns by deep-learning delay or filled pause patterns which occur while each user issues an utterance.

According to the disclosure, the voice recognition device and method precisely perform voice recognition processing.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
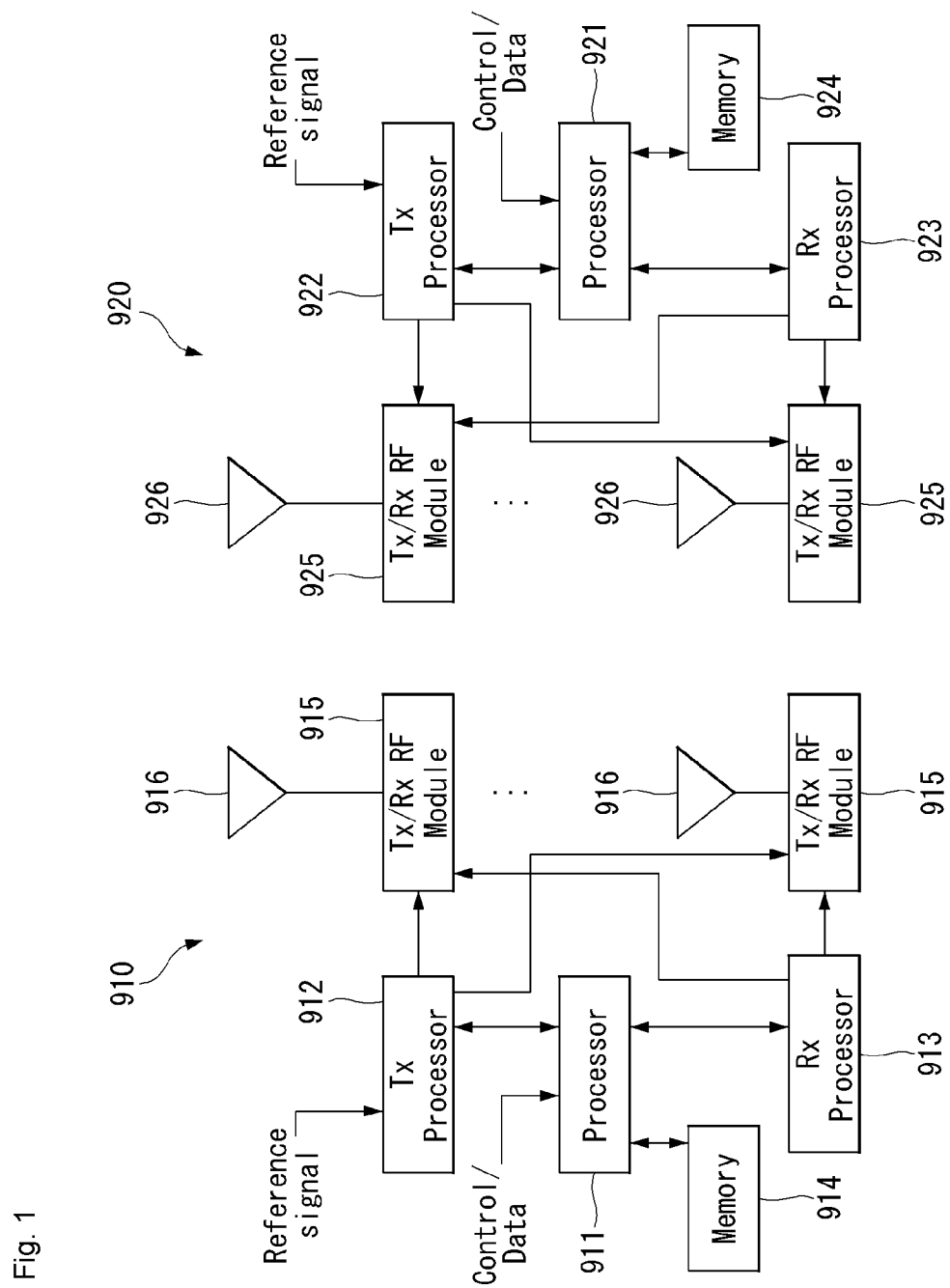
FIG. 1 is a block diagram illustrating a configuration of a wireless communication system to which methods proposed herein may apply.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
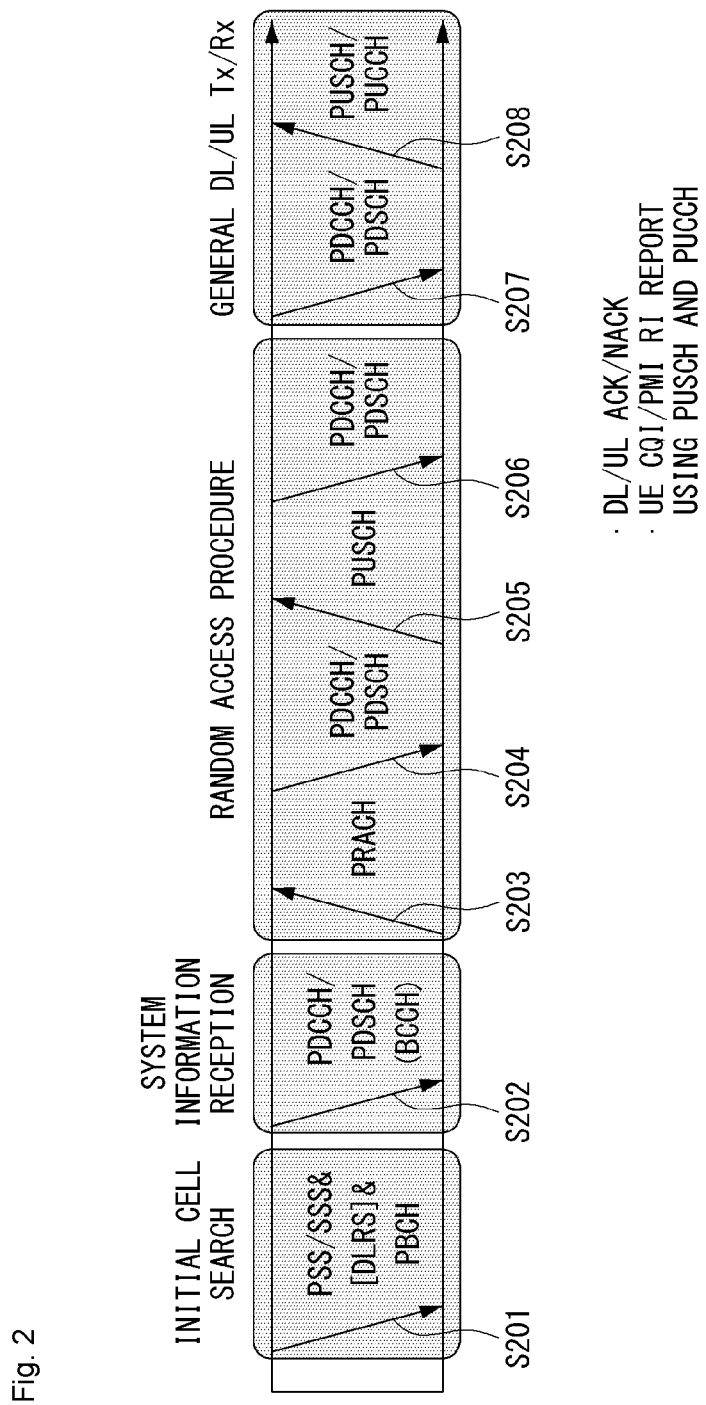
FIG. 2 is a view illustrating an example transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

Figure 3:
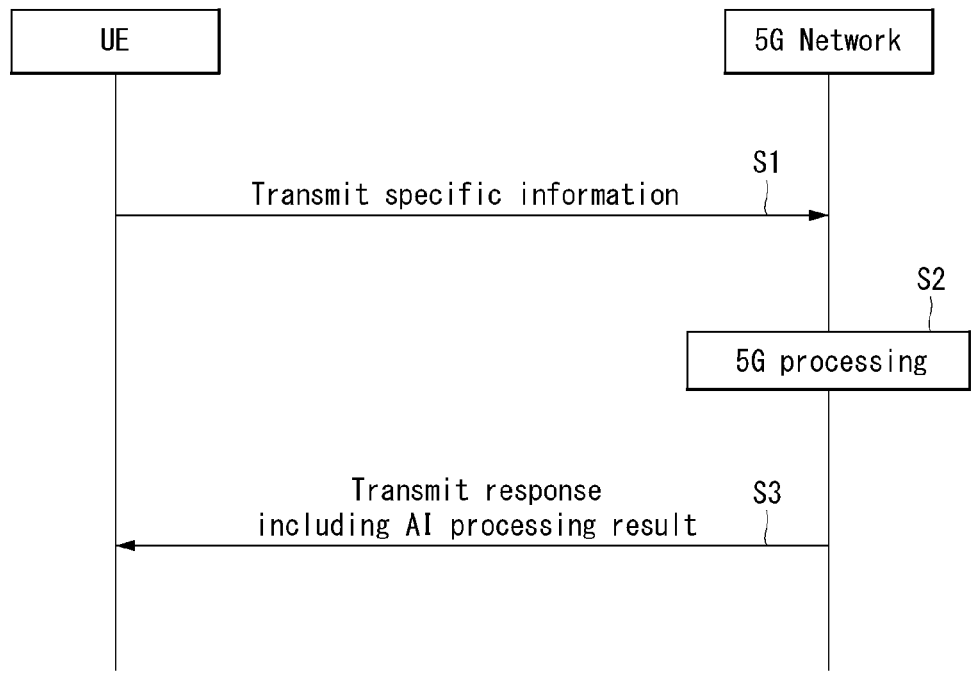
FIG. 3 is a view illustrating example basic operations of a user terminal and a 5G network in a 5G communication system.

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

AI Device Block

Figure 4:
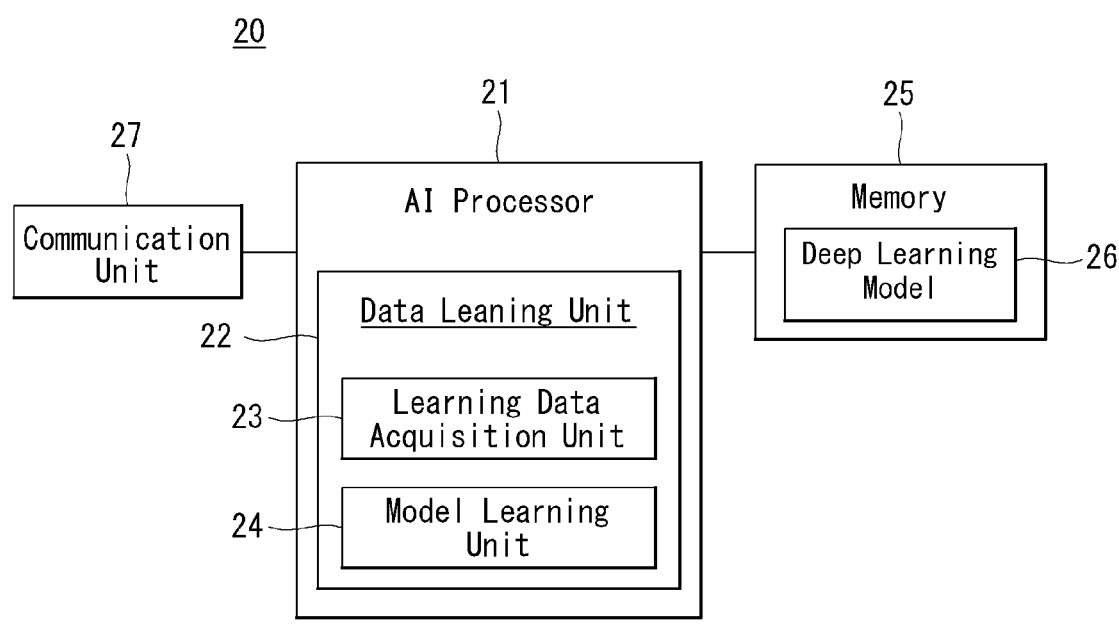
FIG. 4 is a block diagram illustrating an AI device according to an embodiment of the disclosure.

FIG. 4 is a block diagram of an AI device according to an embodiment of the present invention.

An AI device 20 may include an electronic device including an AI module that can perform AI processing, a server including the AI module, or the like. Further, the AI device 20 may be included as at least one component of the vehicle 10 shown in FIG. 1 to perform together at least a portion of the AI processing.

The AI processing may include all operations related to driving of the vehicle 10 shown in FIG. 4. For example, an autonomous vehicle can perform operations of processing/determining, and control signal generating by performing AI processing on sensing data or driver data. Further, for example, an autonomous vehicle can perform autonomous driving control by performing AI processing on data acquired through interaction with other electronic devices included in the vehicle.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to vehicles. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Figure 5:
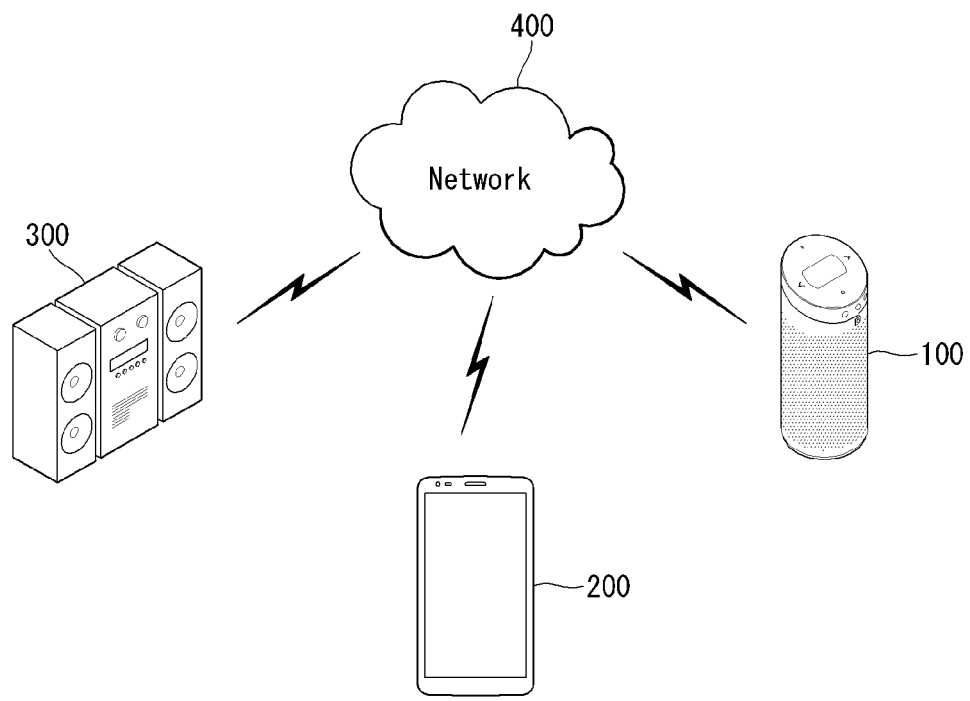
FIG. 5 is a view illustrating a voice recognition system according to an embodiment of the disclosure.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

Hereinafter, a voice recognition device is described in detail with reference to FIGS. 5 to 8, according to an embodiment of the disclosure. According to an embodiment, a voice recognition device 100 may include, or be part of, the above-described AI device 20.

Figure 7:
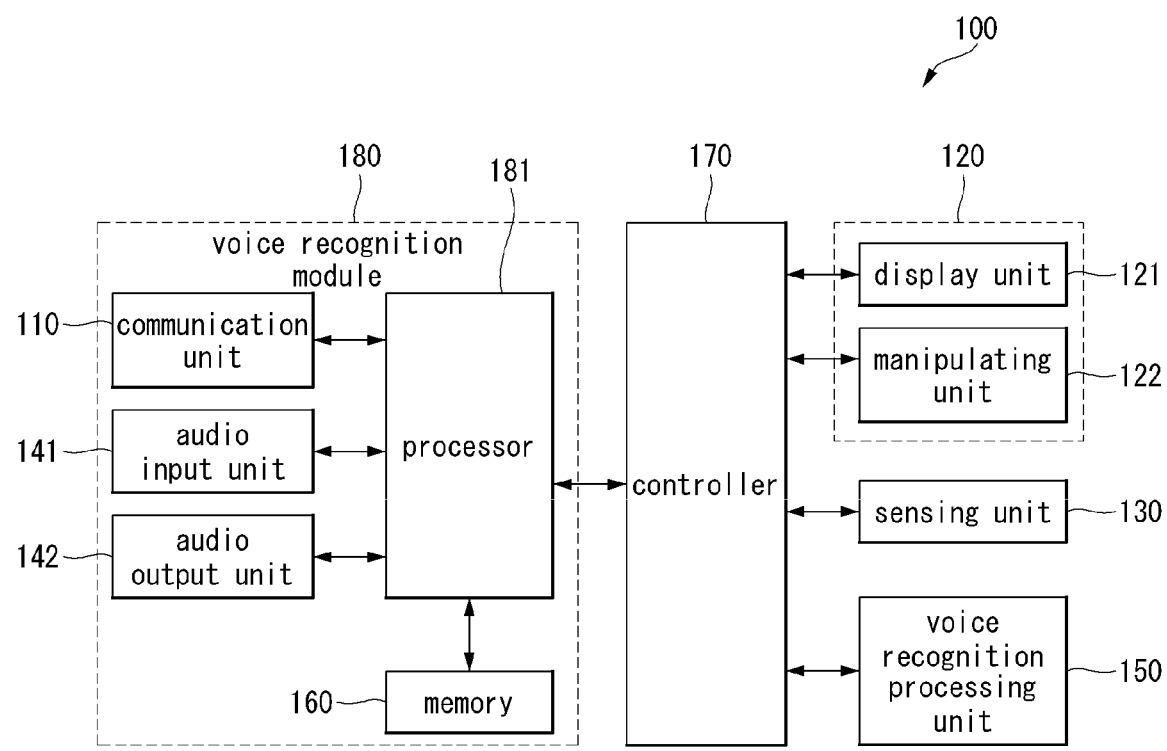
FIG. 7 is a block diagram illustrating a configuration of a voice recognition device according to an embodiment of the disclosure.

Although not shown in FIG. 7, according to an embodiment, the voice recognition device 100 may include the AI processor 21, the memory 25, and the communication unit 27 of FIG. 4 or may include the AI device 20 in which the AI processor 21, the memory 25, and the communication unit 27 have been integrated into a single module.

According to an embodiment, if the voice recognition device 100 does not directly include the AI device 20, the AI device 20 may be included in the server 200 shown in FIG. 5, or the AI device 20 may be configured separately from the server 200. Where the voice recognition device 100 and the AI device 20 are configured separately, the voice recognition device 100 and the AI device 20 are configured to be able to perform data communication.

Referring to FIG. 5, according to an embodiment, a voice recognition system includes a voice recognition device 100, a user terminal 200, a server 300, and a network that interconnects them. The network may be configured to correspond to the above-described 5G communication standards. FIG. 5 is a view illustrating a voice recognition system according to an embodiment of the disclosure.

Other various electronic devices used in homes or offices than the devices shown in FIG. 5 may be interconnected and interoperated in an Internet-of-things (IoT) environment.

The voice recognition device 100 may receive the user's utterance and provide a voice recognition service via recognition and analysis. In the instant embodiment, the voice recognition device 100 may include various electronic devices capable of performing the voice recognition function, such as artificial intelligence (AI) speakers or communication robots.

The voice recognition device 100 may serve as a hub that controls electronic devices lacking the voice input/output functionality.

The voice recognition service may include receiving the user's utterance, differentiating between the wakeup word and the utterance, and outputting a result of voice recognition processing on the utterance to be recognizable by the user.

As used herein, "utterance" means the minimum unit of communication in speech-text linguistics. As used herein, "wakeup word" refers to a specific command that activates the voice recognition function of the voice recognition device 100. The utterance needs to include the wakeup word for the voice recognition function to be activated and, if not, the voice recognition function remains inactive (e.g., sleep mode). The wakeup word may be preset and be stored in the memory 160 included in the voice recognition device 100.

After the voice recognition function of the voice recognition device 100 is activated by the wakeup word, the utterance issued by the user may be identified as a voice command that the voice recognition device 100 may substantially process to generate an output.

For example, if the user's whole utterance is "Hi LG Turn on the air conditioner," the wakeup word may be "Hi LG" and the voice command may be "Turn on the air conditioner." In this case, the voice recognition device 100 receives and analyzes the user's utterance, determines the presence of the wakeup word, and executes the utterance to control the air conditioner (not shown) which is an electronic device.

In the instant embodiment, after receiving the wakeup word and in the state of having activated the voice recognition function, the voice recognition device 100 determines a temporary pause for receiving a first utterance while receiving the first utterance. The voice recognition device 100 outputs a result of voice recognition processing on a second utterance received after the temporary pause, separately from the first utterance, and determines a third utterance received after the result of voice recognition of the second utterance as an extension to the first utterance, and determines the intent of the third utterance. Thereafter, upon combining the first utterance and the third utterance, the voice recognition device 100 combines the first utterance and the third utterance without duplication of the same word or information, and generates a user voice command based thereupon. The voice recognition device 100 may perform voice recognition processing based on the user voice command and output the result.

The first utterance may include a first voice command that is uttered after the user utters the wakeup word, and the first utterance may include an incomplete utterance. The second utterance may include a second voice command that is uttered after determining the temporary pause of the first utterance, and the second utterance may include a complete utterance. The third utterance may include a third voice command that the user utters after outputting the result of voice recognition processing on the second utterance, and the third utterance may be a voice command that is an extension to the first voice command, and the third utterance may also include an incomplete utterance. The user's voice command includes a complete utterance which is a combination of the first and third utterances and grasps the intent of the incomplete first utterance and the incomplete third utterance.

In this embodiment, the complete utterance includes a voice command that may output the result of voice recognition processing. The incomplete utterance includes a voice command that is unable to output the result of voice recognition processing.

In the instant embodiment, if receiving the wakeup word from the user and thus turns to the voice recognition function active state, the voice recognition device 100 converts the voice command, i.e., utterance, received from the user into text using a sound model (not shown) and a language model (not shown) stored therein.

The voice recognition device 100 grasps the intent of utterance by performing syntactic analysis or semantic analysis on the converted text, converts into text in the form of a natural language utterance, converts the natural language form of text into voice information, and outputs the same as the result of voice recognition processing.

Besides performing its own voice recognition processing, the voice recognition device 100 may transmit the utterance to the server 300, receive the result of voice recognition processing from the server 300, and output the result.

The user terminal 200 may access a voice recognition driving application or voice recognition driving website and, after authentication, receive a service for monitoring the state information for the voice recognition device 100 or driving or controlling the voice recognition device 100. In the present embodiment, after authenticated, the user terminal 200, upon receiving, e.g., a user voice command, may determine the operation mode of the voice recognition device 100 and operate, or control the operation of, the voice recognition device 100.

The user terminal 200 may include a communication terminal capable of performing the functions of a computing device (not shown). In the instant embodiment, the user terminal 200 may be, but is not limited to, a user-manipulated desktop computer, smartphone, laptop computer, tablet PC, smart TV, mobile phone, personal digital assistant (PDA), media player, micro server, global positioning system (GPS) device, electronic book reader, digital broadcast terminal, navigation, kiosk, MP3 player, digital camera, home appliance, or other mobile or non-mobile computing devices.

The user terminal 200 may be a watch, glasses, hair band, ring, or one of other various types of wearable device which is equipped with communication and data processing functionality. The user terminal 200 is not limited to those enumerated above, and any terminal which is capable of web browsing may be included in the user terminal 200.

The server 300 may be a server that provides bigdata necessary for applying various artificial intelligence algorithms and data regarding voice recognition. The server 30 may include a web server or application server for remotely controlling the voice recognition device 100 using an application or web browser installed on the user terminal 200.

After receiving the wakeup word so that the voice recognition function is activated, the voice recognition device 100 transmits, rather than processing on its own the subsequent utterance received to the server 300, and the server 300 determines whether a temporary pause has occurred in the first utterance from the voice recognition device 100.

Upon determining that a temporary pause has occurred in the first utterance, the server 300 receives the second utterance from the voice recognition device 100 after the temporary pause, generates a result of voice recognition processing on the second utterance, and transmits the result to the voice recognition device 100. The voice recognition device 100 outputs the result of voice recognition processing on the second utterance and transmits the third utterance received from the user to the server 300. The server 300 determines that the third utterance is an extension to the first utterance, generates a result of voice recognition processing on a fourth utterance, which is a combination of the first utterance and the third utterance, and transmits the generated result to the voice recognition device 100. The voice recognition device 100 outputs the result of voice recognition processing on the fourth utterance.

The network 400 may connect the voice recognition device 100 with the user terminal 200. The network 400 may encompass, e.g., local area networks (LANs), wide area networks (WANs), metropolitan area networks (MANs), integrated service digital networks (ISDNs), or other wired networks or wireless LANs, CDMA, Bluetooth, satellite communication networks or other wireless networks, but the scope of the disclosure is not limited thereto.

The network 400 may transmit/receive information using short-range communication and/or remote communication. The short-range communication may include Bluetooth, radio frequency identification (RFID), infrared data association (IrDA), ultra-wideband (UWB), ZigBee, and wireless fidelity (Wi-Fi) technology, and the remote communication may include code division multiple access (CDMA), frequency division multiple access (FDMA), time division multiple access (TDMA), orthogonal frequency division multiple access (OFDMA), and single carrier frequency division multiple access (SC-FDMA) technology.

The network 400 may include connections of network components, such as hubs, bridges, routers, switches, and gateways. The network 400 may include one or more connected networks, e.g., a multi-network environment, including public networks such as the Internet and private networks such as safe business private networks. Access to the network 400 may be provided via one or more wired or wireless access networks. Further, the network 400 may support Internet-of-things (IoT) networks, which exchange information between distributed components, e.g., things, and process the information, and/or 5G communication.

Figure 6:
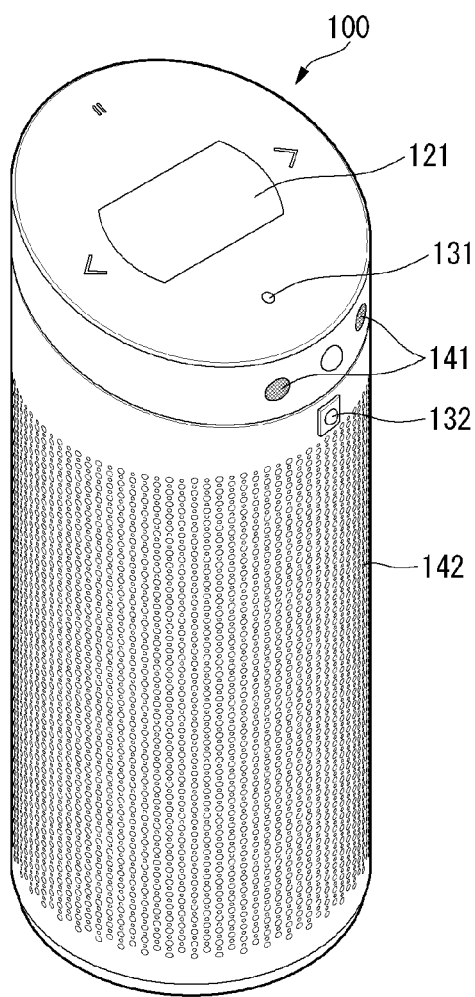
FIG. 6 is a view illustrating an outer appearance of a voice recognition device according to an embodiment of the disclosure.

FIG. 6 is a view illustrating an outer appearance of a voice recognition device according to an embodiment. FIG. 7 is a block diagram illustrating a configuration of a voice recognition device according to an embodiment.

Referring to FIGS. 6 and 7, the voice recognition device 100 includes a user interface unit 120 including a communication unit 110, a display unit 121, and a manipulating unit 122, a sensing unit 130, an audio input unit 141, an audio output unit 142, a voice recognition processing unit 150, a memory 160, a controller 170, and a processor 181. The communication unit 110, audio input unit 141, audio output unit 142, memory 160, and processor 181 may be grouped into a voice recognition module 180.

The voice recognition module 180 includes the communication unit 110 that transmits driving signals corresponding to voice commands and/or various pieces of information to the user terminal 200 and/or server 300, the audio input unit 141 that receives uttered voices, the audio output unit 142 that outputs the result of voice recognition processing in an audio, and the processor 181 that analyzes the voice command using a voice recognition algorithm and generates the result of voice recognition processing, and the voice recognition module 180 may more efficiently perform voice recognition and analysis and processing on the voice recognition processing result.

The processor 181 included in the voice recognition module 180 may be configured as an AI processor and may be trained with all voice data gathered by the voice recognition device 100 by a deep neural network.

The communication unit 110 may provide a communication interface necessary to interwork with the network 400 to provide transmission/reception signals in the form of packet data between the voice recognition device 100 and other electronic device and/or the user terminal 200 and/or the server 300. The communication unit 110 may receive a predetermined information request signal from the electronic device and/or user terminal 200 and transmit information processed by the voice recognition device 100 to the electronic device and/or the user terminal 200. The communication unit 110 may transmit the predetermined information request signal from the electronic device and/or user terminal 200 to the server 300, receive a response signal processed by the server 300, and transmit the response signal to the electronic device and/or user terminal 200. The communication unit 110 may be a device including hardware or software necessary to transmit/receive signals such as control signals or data signals via wired/wireless communication with other network devices.

In this embodiment, the other electronic devices may include home appliances, e.g., air conditioners, refrigerators, or washers, which lack voice input/output functionality, and the home appliances may be controlled by the voice recognition device 100. The other electronic devices may also include voice input/output functionality-equipped home appliances.

The communication unit 110 may support various types of communication, including IoT, Internet-of-everything (IoE), Internet-of-small-things (IoST), machine-to-machine (M2M), vehicle-to-everything-communication (V2X), device-to-device (D2D) communication.

The display unit 121 of the user interface unit 120 may display driving state of the voice recognition device 100 under the control of the controller 170. According to an embodiment, the display unit 121 may form a layered structure with a touchpad and be configured as a touchscreen. In this case, the display unit 121 may also be used as the manipulating unit 122 that enables information entry by the user's touch. To that end, the display unit 121 may be configured of a touch recognition display controller or other various input/output controllers.

As an example, the touch recognition display controller may provide an output interface and input interface between the device and the user. The touch recognition display controller may transmit/receive electric signals to/from the controller 170. The touch recognition display controller may display visual outputs to the user, and the visual outputs may include text, graphics, images, videos, or combinations thereof.

The display unit 121 may be a predetermined display member, such as organic light emitting display (OLED), liquid crystal display (LCD), or light emitting display (LED), which is capable of touch recognition.

The manipulating unit 122 of the user interface unit 120 may have a plurality of manipulation buttons (not shown) and transmit signals corresponding to the buttons to the controller 170. The manipulating unit 122 may be configured of sensors or buttons that may recognize the user's touches or pressings or of a switch structure. In the instant embodiment, the manipulating unit 122 may transmit, to the controller 170, signals of manipulation by the user to identify or vary various pieces of information related to driving of the voice recognition device 100 displayed on the display unit 121.

In this embodiment, the manipulating unit 122 may include a plurality of contact switches (not shown), and how the respective output signals of the contact switches are processed may be determined by a program pre-stored in the memory 160. For example, the plurality of contact switches may include a first to fourth contact switch. The menu items displayed at the left or right side on the display unit 121 may be selected by an operation signal from the first or second contact switch, and the menu items displayed at the top or bottom on the display unit 121 may be selected by an operation signal from the third or fourth contact switch. The voice recognition function may be activated by operating one of the first to fourth contact switches.

The sensing unit 130 may include a proximity sensor 131 and an image sensor 132 that senses the ambient context of the voice recognition device 100. The proximity sensor 131 may obtain location data for the object (e.g., the user) around the voice recognition device 100 using, e.g., infrared light. The user's location data obtained by the proximity sensor 131 may be stored in the memory 160.

The image sensor 132 may include a camera (not shown) capable of capturing the surroundings of the voice recognition device 100. A plurality of image sensors 132 may be installed for capturing efficiency purposes. For example, the camera may include an image sensor (e.g., a CMOS image sensor) including at least one optical lenses and a plurality of photodiodes (e.g., pixels) to which images are formed by light transmitted through the optical lenses and a digital signal processor (DSP) that forms images based on signals output from the photodiodes. The DSP may generate still images and a video constituted of the frames of still images. Images captured and obtained by the camera, as the image sensor 132, may be stored in the memory 160.

Although the sensing unit 130 is limited to the proximity sensor 131 and the image sensor 132 in the instant embodiment, embodiments of the disclosure are not limited thereto. For example, the sensing unit 130 may include any sensor capable of sensing the ambient circumstance of the voice recognition device 100, e.g., at least one of lidar sensors, weight sensors, illumination sensors, touch sensors, acceleration sensors, magnetic sensors, G-sensors, gyroscope sensors, motion sensors, RGB sensors, infrared (IR) sensors, finger scan sensors, ultrasonic sensors, optical sensors, microphones, battery gauges, environment sensors (e.g., barometers, hygrometers, thermometers, radiation sensors, heat sensors, or gas sensors), chemical sensors (e.g., electronic noses, healthcare sensors, or biometric sensors). In the instant embodiment, the voice recognition device 100 may use a combination of pieces of information sensed by at least two or more sensors among the sensors.

The audio input unit 141 of the audio processing unit 140 may receive the user's uttered voice (e.g., a wakeup word and voice command) and transmit the uttered voice to the controller 170. The controller 170 may transmit the user's uttered voice to the voice recognition module 180. To that end, the audio input unit 141 may include one or more microphones (not shown). The audio input unit 141 may a plurality of microphones (not shown) to more precisely receive the user's uttered voice. The plurality of microphones may be spaced apart from each other in different positions and may process the uttered voice received from the user into an electrical signal.

For example, the audio input unit 141 may use various noise canceling algorithms to remove noise that is added while receiving the user's uttered voice. As another example, the audio input unit 141 may include various components for voice signal processing, such as a filter (not shown) to remove noise upon receiving the user's uttered voice and an amplifier (not shown) to amplify and output signals output from the filter.

The audio output unit 142 of the audio processing unit 140 may output, in an audio, notification messages, such as alert sounds, operation modes, operation states, or error states, information corresponding to the user's command input, and the result of processing corresponding to the user's command input, under the control of the controller 170. The audio output unit 142 may convert the electrical signal from the controller 170 into an audio signal and output the audio signal. To that end, the audio output unit 142 may include, e.g., a speaker.

The voice recognition processing unit 150 may receive a wakeup word and activate the voice recognition function and, in that state, the voice recognition processing unit 150 may determine a temporary pause for reception of a first utterance while receiving the first utterance, output the result of voice recognition processing on a second utterance received after the temporary pause, separately from the first utterance, determine that a third utterance received after outputting the result of voice recognition processing on the second utterance is an extension to the first utterance, and output the result of voice recognition processing on a fourth utterance which is a combination of the first utterance and the third utterance.

According to an embodiment, the voice recognition processing unit 150 may perform learning in association with the controller 170 and receive the result of learning from the controller 170. According to an embodiment, the voice recognition processing unit 150 may be configured separately from the controller 170 inside the voice recognition device 100 as shown in FIG. 7, or the voice recognition processing unit 150 may be provided inside the controller 170 to operate along with the controller 170. According to an embodiment, the voice recognition processing unit 150 may be provided inside the server 300 of FIG. 5, rather than inside the voice recognition device 100.

The voice recognition processing unit 150 is described below in the relevant part with reference to FIG. 8.

According to an embodiment, the memory 160 included in the voice recognition device 100 may store various pieces of information necessary for operation of the voice recognition device 100 and may include a volatile or non-volatile recording medium. For example, the memory 160 may store a preset wakeup word for determining the presence of a wakeup word from the user's uttered voice. The wakeup word may be preset by the manufacturer. For example, "Hi LG" may be set as the wakeup word and may be changed by the user. The wakeup word may be input to activate the voice recognition function of the voice recognition device 100. Upon recognizing the wakeup word uttered by the user, the voice recognition device 100 switches the voice recognition function into the active state.

Here, the memory 160 may include magnetic storage media or flash storage media, but the scope of the disclosure is not limited thereto. The memory 160 may include an internal memory and/or an external memory and may include volatile memories, such as DRAMs, SRAMs, or SDRAMs, non-volatile memories, such as one-time programmable ROMs (OTPROMs), PROMs, EPROMs, EEPROMs, mask ROMs, flash ROMs, NAND flash memories, or NOR flash memories, flash drives, such as SSDs, compact flash (CF) cards, SD cards, micro-SD cards, mini-SD cards, xD cards, or Memory Stick™, or storage devices, such as HDDs.

The controller 170 may transmit the uttered voice received through the audio input unit 141 to the voice recognition module 180 and may provide the voice recognition processing result from the voice recognition module 180, as visual information, through the display unit 121 or, as audible information, through the audio output unit 142.

The controller 170 may be a sort of central processing unit, and the controller 170 may drive the control software stored in the memory 160 to control the overall operation of the voice recognition device 100.

The controller 170 may include any kind of device capable of processing data, such as a processor. As used herein, 'processor' may refer to a data processing device embedded in hardware and having a physically structured circuit to perform functions represented in codes or commands included in the program. Examples of the data processing device embedded in hardware may include microprocessors, central processing units (CPUs), processor cores, multi-processors, application-specific integrated circuits (ASICs), field programmable gate arrays (FPGAs), or other processing devices, but the scope of the disclosure is not limited thereto.

The controller 170 may perform deep learning or machine learning on the user's uttered voice to allow the voice recognition device 100 to output the optimal voice recognition processing result, and the memory 160 may store, e.g., data used for machine learning and the result data.

The controller 170 may be equipped with an artificial neural network and may perform machine learning-based user recognition and user voice recognition using the received voice input signal as input data.

The controller 170 may include an artificial neural network, e.g., a CNN, RNN, DBN, or such deep neural network (DNN), and may perform learning on data for all voices gathered by the voice recognition device 100, with the deep neural network. As the machine learning method of the artificial neural network, unsupervised learning and supervised learning both may be put to use. The controller 170, after data learning on voices depending on the settings, may update the existing artificial neural network structure.

The voice recognition processing unit 150 is described below in greater detail with reference to FIG. 8. FIG. 8 is a block diagram illustrating a specific configuration of a voice recognition processor as illustrated in FIG. 7. The same components of the voice recognition processing unit 150 as those described above are not repetitively described below.

Figure 8:
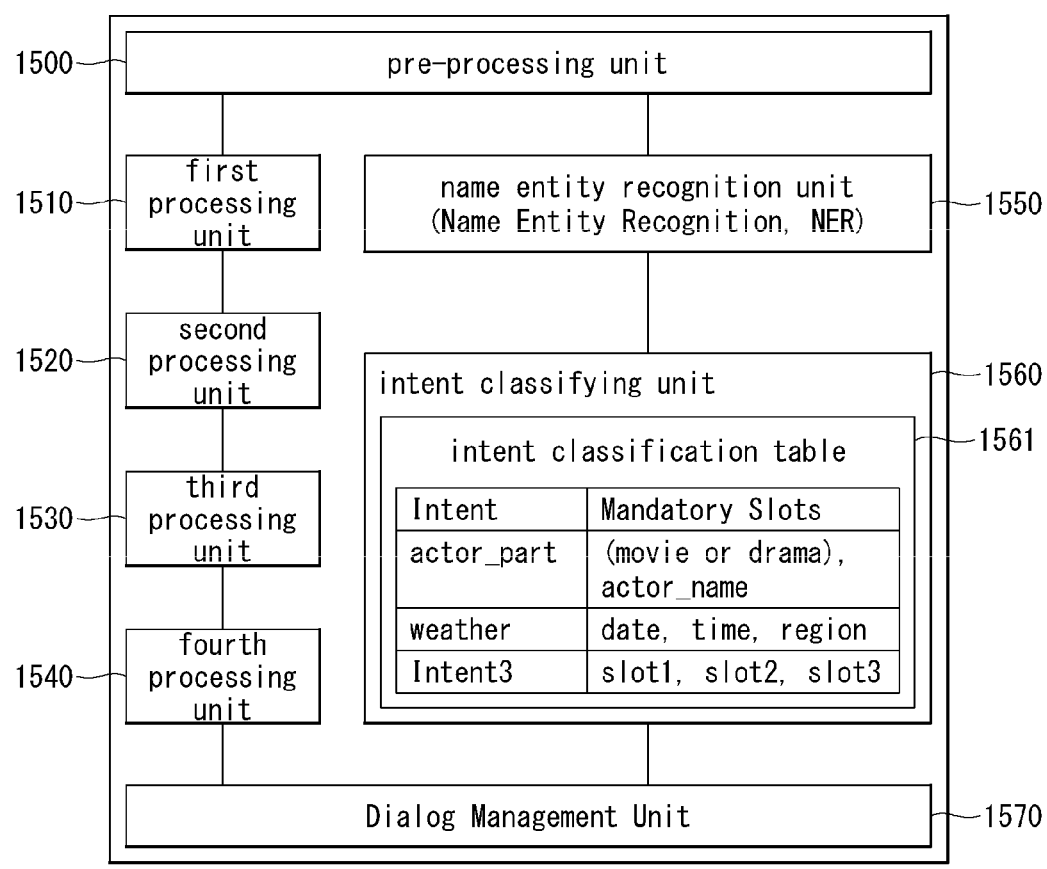
FIG. 8 is a block diagram illustrating a specific configuration of a voice recognition processor as illustrated in FIG. 7.

Referring to FIG. 8, the voice recognition processing unit 150 includes a pre-processing unit 1500, a first processing unit 1510, a second processing unit 1520, a third processing unit 1530, a fourth processing unit 1540, an name entity recognition unit 1550, an intent classifying unit 1560, and a dialog management unit 1570. The voice recognition processing unit 150 interworks with the voice recognition module 180.

The pre-processing unit 1500, before receiving a utterance, receives a wakeup word and converts the user's uttered voice into text. The pre-processing unit 1500 may compare the text with a wakeup word preset in the memory 160, determining whether the user's uttered voice is the wakeup word. Thereafter, upon determining that the user's uttered voice matches the wakeup word, the pre-processing unit 1500 may transmit a signal indicating that the wakeup word has been recognized to the processor 181 of the voice recognition module 180 and/or the controller 170. Upon receiving the wakeup word recognition signal from the pre-processing unit 1500, the processor 181 and/or controller 170 switches the voice recognition function of the voice recognition device 100 into the active mode. Specifically, the voice recognition module 180 of the voice recognition device 100 switches to the active mode, allowing it to be voice recognition-capable.

If the voice recognition module 180 switches to the active mode, the first processing unit 1510 receives a first utterance, which is a first voice command generated by the user, via the audio input unit 141. Upon recognizing a temporary pause signal for reception of the first utterance while receiving the first utterance, the first processing unit 1510 may determine whether to temporarily stop receiving the first utterance and may temporarily stop receiving the first utterance.

For example, the first processing unit 1510 may recognize that a filled pause, which is a non-linguistic element, is included in the first utterance while receiving the first utterance. Since the filled pause is a temporary pause signal, the first processing unit 1510 may temporarily stop receiving the first utterance while simultaneously recognizing the filled pause of the first utterance.

The filled pause refers to a meaningless exclamation that occurs as the user fails to naturally continue to utter and such includes non-linguistical elements, such as meaningless syllables or words, e.g., "uh" or "uhm."

The first processing unit 1510 recognizes a syllable or word included in the first utterance and compares the recognized syllable or word with syllables or words included in a filled pause dictionary (not shown) pre-stored in the memory 160. If the comparison reveals that the recognized syllable or word is identical to a syllable or word included in the filled pause dictionary, the first processing unit 1510 may temporarily stop the reception of the first utterance.

Upon recognizing a silent delay that occurs for a preset time (e.g., 5 seconds to 15 seconds) while receiving the first utterance, the first processing unit 1510 recognizes the same as a temporary pause signal for reception of the first utterance. The first processing unit 1510 determines the temporary pause on reception of the first utterance and may temporarily stop the reception of the first utterance.

If a preset keyword for determining a temporary pause is included in the first utterance while receiving the first utterance, the first processing unit 1510 may recognize the same as a temporary pause signal for reception of the first utterance and temporarily stop receiving the first utterance based on such recognition. The keyword for determining a temporary pause includes, e.g., "Wait" or "Hang on," and is stored in the memory 160. Since the first processing unit 1510 may recognize the words included in the first utterance, if a recognized word is identical to the keyword for determining a temporary pause stored in the memory 160, the first processing unit 1510 may temporarily stop receiving the first utterance.

If temporarily stopping the reception of the first utterance, the first processing unit 1510 may wait for voice recognition processing on the first utterance received before the temporary pause and temporarily store the first utterance in the memory 160. If temporarily stopping the reception of the first utterance, the first processing unit 1510 may determine that there is an additional utterance (hereinafter, referred to as a second utterance) whose voice recognition processing result is further needed in addition to the first utterance.

In other words, upon recognizing at least one or more of filled pauses, keywords for determining a temporary pause, and silent delays, the first processing unit 1510 temporarily stops receiving the first utterance, waits for voice recognition processing on the first utterance, and then receives the second utterance.

If the first processing unit 1510 temporarily stops receiving the first utterance, the second processing unit 1520 receives the second utterance, processes voice recognition on the second utterance, and then outputs the result of processing.

The second processing unit 1520 transmits the second utterance, which is an additional utterance received via the audio input unit 141, to the voice recognition module 180, receives the result of voice recognition processing from the voice recognition module 180, and outputs the voice recognition processing result through the audio output unit 142 and/or the display unit 121.

In this case, the voice recognition device 100 maintains the voice recognition active state until the second processing unit 1520 recognizes the second utterance and outputs the result of voice recognition processing on the second utterance. The conventional voice recognition processing device, if temporarily stopping or pausing voice recognition on the original utterance, i.e., the first utterance, switches the voice recognition function into the inactive mode. Further, the conventional voice recognition processing device temporarily stops receiving the original utterance, i.e., the first utterance and, until it receives an additional utterance, i.e., the second utterance, or outputs the result of processing on the second utterance, the conventional voice recognition processing device maintains the voice recognition function in the inactive state.

However, according to the disclosure, the voice recognition function of the voice recognition device 100 remains in the active state until the second utterance is received and the result of voice recognition processing on the second utterance is output. According to the disclosure, the voice recognition device 100 determines that a third utterance received after outputting the result of voice recognition processing on the additional utterance, i.e., the second utterance, is an extension to the first utterance, as the original utterance.

Thus, the third processing unit 1530 determines that the third utterance received via the audio input unit 141 after the second processing unit 1520 outputs the result of voice recognition on the second utterance is an extension to the first utterance. Further, the third processing unit 1530 maintains the voice recognition function of the voice recognition device 100 in the active state even after the second processing unit 1520 outputs the result of voice recognition processing on the second utterance.

The fourth processing unit 1540 combines the first utterance temporarily stored in the memory 160 with the third utterance received by the third processing unit 1530 to thereby generate a fourth utterance and transmits the fourth utterance to the voice recognition module 180. The fourth processing unit 1540 receives the result of voice recognition processing on the fourth utterance from the voice recognition module 180 and outputs the result through the audio output unit 142 and/or the display unit 121.

The name entity recognition unit 1550 recognizes and classifies name entitys included in the first utterance to the fourth utterance received by the first to fourth processing units 1510, 1520, 1530, and 1540. Here, the name entitys include, e.g., persons' names, movie titles or TV show titles, song titles, or roles, and the names of cities, regions, animals, or things.

In the hypothesis that the user's uttered voice is "Hi LG Let me know the cast of the TV show Iris . . . um . . . wait . . . in the TV show Iris. Let me know Taehee Kim's role" "Hi LG" serves as the wakeup word and allows the voice recognition function of the voice recognition device to be activated, and "Iris" and "Taehee Kim" are the name entitys which are recognized and classified by the name entity recognition unit 1550.

The intent classifying unit 1560 grasps the intent of the first to fourth utterances received by the first to fourth processing units 1510, 1520, 1530, and 1540. In order to grasp the intent of the first to fourth utterances, the intent classifying unit 1560 recognizes and extracts syllables, words, and information included in the first to fourth utterances and classifies the extracted syllables, words, and information corresponding to the items and slots suggested in an intent classification table 1561. Thus, the intent classifying unit 1560 includes at least one or more intent classification tables 1561.

The intent classification table 1561 is divided into items which indicate a plurality of intents each of which includes a plurality of slots as shown in FIG. 8. The slots are variables to which information units for grasping the intent of utterances are inserted, and information inserted to the slots include syllables, words, and/or letters, numbers, or symbols indicating specific information.

To precisely determine the intent of the user's utterance, the number of slots included in the intent item may be preset and variable. To determine whether an utterance corresponds to its corresponding intent per intent item, the minimum number of slots that needs to be filled to be able to grasp how many syllables or words or how much specific information is included in the utterance to be able to indicate the intent is preset as well.

In other words, the intent classifying unit 1560 inserts at least one or more of the syllables, words, and specific information extracted from the first to fourth utterances to the plurality of slots associated with each intent item, thereby identifying whether the slots are filled in such an extent that the utterance may be determined to correspond to the intent item. Further, the intent classifying unit 1560 may receive the name entity extracted from the name entity recognition unit 1550 from the name entity recognition unit 1550 and insert the same to the plurality of slots associated with the intent item.

For example, the intent classification table 1561 shown in FIG. 8 may include "actor_part" (actors), "weather" (weather), and "Intent3" (intent randomly settable by the user or manager) as the intent items. If the user's uttered voice is "Let me know Taehee Kim's role in the TV show Iris," the intent classifying unit 1560 inserts all of the name entitys, "Iris" and "Taehee Kim," extracted by the name entity recognition unit 1550 to the slots associated with the "actor_part" item. This is why the first intent item, "actor_part," includes "movie or drama name' and 'actor name' as variables insertable to the slots to determine the intent.

On the other hand, the intent classifying unit 1560 may insert nothing to the slots associated with the second intent item, "weather." This is why the user's uttered voice is "Let me know Taehee Kim's role in the TV show Iris," and the utterance does not include syllables, words, and information which correspond to the slots, 'date,' 'time,' and 'region,' associated with 'weather.'

As set forth above, the intent classifying unit 1560 applies the information contained in the user's utterance to the intent classification table 1561, determining the intent of each of the first to third utterances. The respective intents of the first utterance and the third information are compared with each other, and the intent of the fourth utterance associated with the third utterance and the first utterance is determined as well. In this case, even when the fourth processing unit 1540 does not generate the fourth utterance by combining the first utterance and the third utterance, the intent classifying unit 1560 may determine the intent of the fourth utterance, which is a combination of the first utterance and the third utterance, only with the intent of the first utterance and the intent of the third utterance.

The fourth utterance contains information that the user actually desires to inquire the voice recognition device 100 about or a command for the function that the voice recognition device 100 is to indeed perform and, thus, the fourth utterance may also be referred to as the user's voice command. Hereinafter, the fourth utterance is referred to as a user voice command.

The intent classifying unit 1560 transfers all of the intents of the first to fourth utterances so determined to the dialog management unit 1570.

The dialog management unit 1570 compares the first to fourth utterances received by the first to fourth processing units 1510, 1520, 1530, and 1540 and the intents of the first to fourth utterances transmitted from the intent classifying unit 1560, identifying whether the fourth utterance, i.e., the user voice command, has been generated to match the user's original intent. The dialog management unit 1570 grasps syllables, words, and information which are missing or duplicated from the first utterance or the third utterance and identifies whether the fourth utterance generated by the first processing unit is a user voice command recognizable by the voice recognition device 100 or the voice recognition module 180. Unless the fourth utterance is a user voice command recognizable by the voice recognition device 100 or voice recognition module 180, the dialog management unit 1570 generates a user voice command based on the common intent for the first utterance and the third utterance and enables the voice recognition device 100 or voice recognition module 180 to recognize the generated user voice command.

According to the disclosure, the voice recognition device 100 may grasp and compare each intent of the original utterance separated by filled pauses or silent delay by the voice recognition processing unit 150, thereby precisely recognizing the original utterance. According to the disclosure, even when the user's original utterance is stopped from reception by a filled pause or silent delay or the original utterance itself is separated, the voice recognition device 100 may precisely recognize the original utterance without interference by the processing of an additional utterance.

A method of recognizing a user's original utterance by a voice recognition device 100 is described below in detail with reference to FIGS. 9 to 11.

The same components as those of the above-described voice recognition device 100 are not repetitively described or are briefly described to avoid duplicate description. The same elements are denoted with the same reference numerals.

Figure 9:
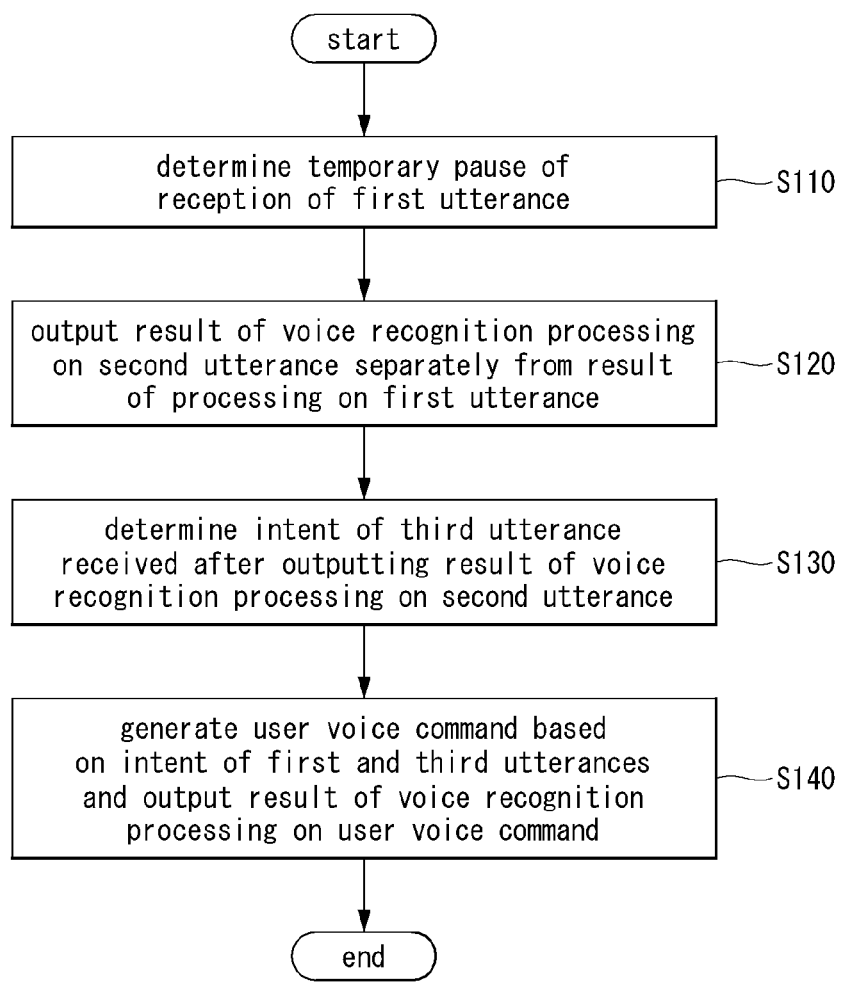
FIG. 9 is a flowchart illustrating a method of recognizing a user's original utterance by a voice recognition device 100 according to an embodiment of the disclosure.
Figure 10:
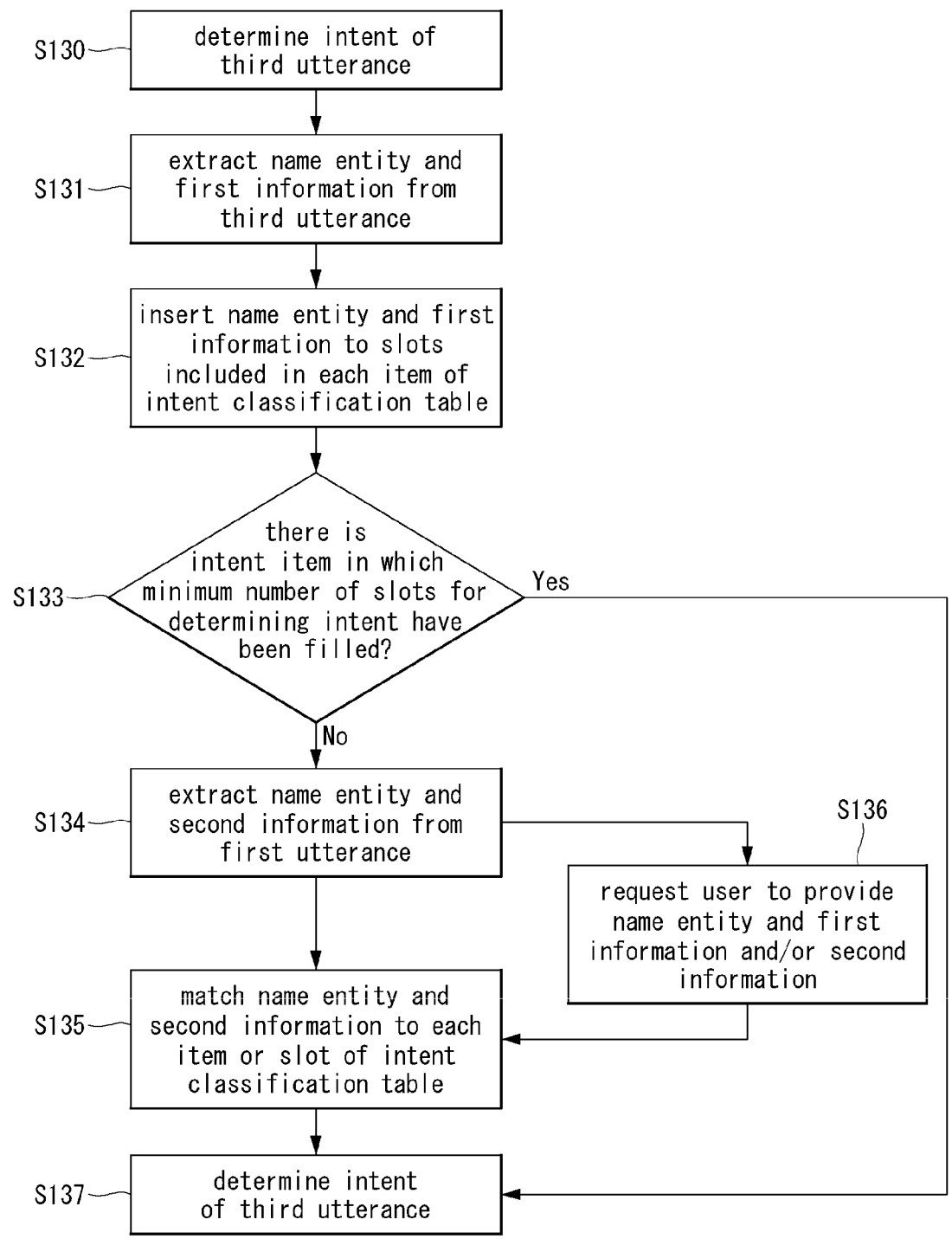
FIG. 10 is a flowchart illustrating a method of determining the intent of a third utterance by a voice recognition device 100 according to an embodiment of the disclosure.

FIG. 9 is a flowchart illustrating a method of recognizing a user's original utterance by a voice recognition device 100 according to an embodiment of the disclosure. FIG. 10 is a flowchart illustrating a method of determining the intent of a third utterance by a voice recognition device 100 according to an embodiment. FIG. 11 is a view illustrating an example of recognizing a user's original utterance by a voice recognition device 100 according to an embodiment of the disclosure.

First, the voice recognition device 100 receives a wakeup word to activate the voice recognition function, and the first processing unit 1510 receives the user's first utterance via the audio input unit 141.

Thereafter, the first processing unit 1510 identifies whether the first utterance includes any one of filled pauses, silent delay, and keywords for determining a temporary pause and determines whether to temporarily stop receiving the first utterance (S110).

In step S110, upon recognizing any one of a filled pause, silent delay, and temporary pause determination-purpose keyword, as a temporary pause signal, while receiving the first utterance, the first processing unit 1510 temporarily stops receiving the first utterance, temporarily stores the first utterance received before the temporary pause in the memory 160, and waits for voice recognition processing.

Thereafter, the voice recognition device 100 may receive an additional utterance, i.e., a second utterance, for which additional voice recognition processing is desired in addition to the first utterance.

The voice recognition device 100 sends the second utterance received after the temporary pause to the second processing unit 1520, and the second processing unit 1520 performs voice recognition processing on the received second utterance and then outputs the result of voice recognition processing on the additional utterance (S120). At this time, the voice recognition device 100 may maintain the voice recognition active state from the reception of the second utterance until outputting the result of voice recognition processing on the second utterance by the second processing unit 1520. The second processing unit 1520, even after outputting the result of voice recognition processing on the second utterance, may allow the voice recognition function of the voice recognition device 100 to remain in the active mode. Further, the second processing unit 1520 allows the voice recognition function of the voice recognition device 100 to remain in the active mode until the fourth processing unit 1540 generates the fourth utterance and outputs the result of voice recognition processing on the fourth utterance. This is for the third utterance received after the result of voice recognition processing on the second utterance to be combined or merged with the first utterance to construct the user's original utterance and for the first utterance to naturally extend to the third utterance.

Meanwhile, if the second processing unit 1520 outputs the result of voice recognition processing on the second utterance in step S120, the voice recognition device 100 receives the third utterance and transmits the third utterance to the third processing unit 1530. The third processing unit 1530 determines that the third utterance is an extension to the first utterance. Further, the intent classifying unit 1560 classifies and extracts information from the third utterance to determine the intent of the third utterance (S130).

To determine the intent of the third utterance, the intent classifying unit 1560 extracts name entitys included in the third utterance using the name entity recognition unit 1550 and extracts information indicating the intent of the third utterance from the third utterance using the intent classification table 1561.

The information indicating the intent of the third utterance is information insertable to the plurality of slots associated with each intent item in the intent classification table 1561 shown in FIG. 8 and means syllables, words, and/or letters, numbers, or symbols indicating specific information included in the utterance as described above.

Step S130 is described in greater detail with reference to FIG. 10. The intent classifying unit 1560, in order to determine the intent of the third utterance, extracts first information for determining the intent of the third utterance and all the name entitys included in the utterance from the third utterance using the name entity recognition unit 1550 and the intent classification table 1561 (S131).

The first information refers to information insertable to the plurality of slots associated with each intent item in the intent classification table 1561 shown in FIG. 8 and includes syllables, words, and/or letters, numbers, or symbols indicating specific information included in the utterance.

To match the name entitys and first information extracted from the third utterance to each intent item in the intent classification table 1561, the intent classifying unit 1560 directly matches the name entitys and first information to the intent items or inserts them to the slots associated with each intent item (S132). In other words, in step S132, as an example method for matching the name entitys and first information extracted from the third utterance to each intent item, the intent classifying unit 1560 performs the task of inserting the name entitys and first information extracted from the third utterance to the slots associated with each intent item.

Thereafter, the intent classifying unit 1560 determines whether there is any intent item in which a minimum number of slots necessary for grasping the intent have been filled (S133).

Upon identifying that there is an intent item in which the minimum number of slots for grasping the intent have been filled in step S133, the intent classifying unit 1560 may determine the common intent for the first utterance and the third utterance which is determined to be an extension to the first utterance and determine the intent of the user to use the voice recognition device 100 (S137).

However, upon identifying that there is no intent item in which the minimum number of slots for grasping the intent have been filled in step S133, the intent classifying unit 1560 extracts name entitys and second information from the first utterance using the name entity recognition unit 1550 and the intent classification table 1561 (S134).

The second information refers to information insertable to the plurality of slots associated with each intent item in the intent classification table 1561 shown in FIG. 8 and includes syllables, words, and/or letters, numbers, or symbols indicating specific information included in the utterance. Merely to distinguish from the first information extracted from the third utterance, the second information is denoted as such, and the first information and the second information may include the same syllables, words, and/or, letters, numbers, or symbols.

To match the name entitys and second information extracted from the first utterance to each intent item in the intent classification table 1561, the intent classifying unit 1560 directly matches the name entitys and second information to the intent items or inserts them to the slots associated with each intent item (S135). In other words, in step S134, as an example method for matching the name entitys and second information extracted from the first utterance to each intent item, the intent classifying unit 1560 performs the task of inserting the name entitys and second information extracted from the first utterance to the slots associated with each intent item.

If unable to extract the name entitys and second information in step S134, the intent classifying unit 1560 may output the voice recognition processing result indicating that the intent of the user's original utterance may not be figured out using at least one of the first to fourth processing units 1510, 1520, 1530, and 1540. In particular, the intent classifying unit 1560 may output text or a voice for requesting the user to provide the name entitys and first information and/or second information as the voice recognition processing result using at least one of the first to fourth processing units 1510, 1520, 1530, and 1540 (S136).

Thereafter, if the user issues an information provision utterance for providing the name entitys and first information and/or second information to the voice recognition device 100, the fourth processing unit 1540 determines that the information provision utterance is a supplemental utterance for grasping the common intent for the first utterance and third utterance and performs separate voice recognition processing.

Since the information provision utterance is not classified as an extension to the first utterance or third utterance, the information provision utterance is subjected to voice recognition processing by the intent classifying unit 1560, and no separate voice recognition processing result is output. In other words, the intent classifying unit 1560 extracts name entitys and first information and/or second information from the information provision utterance and applies them to the slots included in the intent classification table (S135). However, the intent classifying unit 1560 does not separately output the result of voice recognition processing on the information provision utterance through the first to fourth processing units 1510, 1520, 1530, and 1540.

Thereafter, the intent classifying unit 1560 identifies that there is an intent item in which a minimum number of slots for grasping intent have been filled and determines that the intent item is the common intent for the first utterance and third utterance (S137).

The dialog management unit 1570 makes up for the words missing from the fourth utterance generated by combining or merging the first utterance and third utterance or prevents duplicate representation of synonyms based on the intent determined by the intent classifying unit 1560, generating a new fourth utterance, i.e., a user voice command, and outputting the result of voice recognition processing on the user voice command.

Described below is an example of recognizing a user's utterance and outputting the result of voice recognition processing via the above-described voice recognition method by the voice recognition device 100 with reference to FIG. 11, according to an embodiment. FIG. 11 is a view illustrating an example of recognizing a user's utterance by a voice recognition device 100 according to an embodiment of the disclosure.

Figure 11:
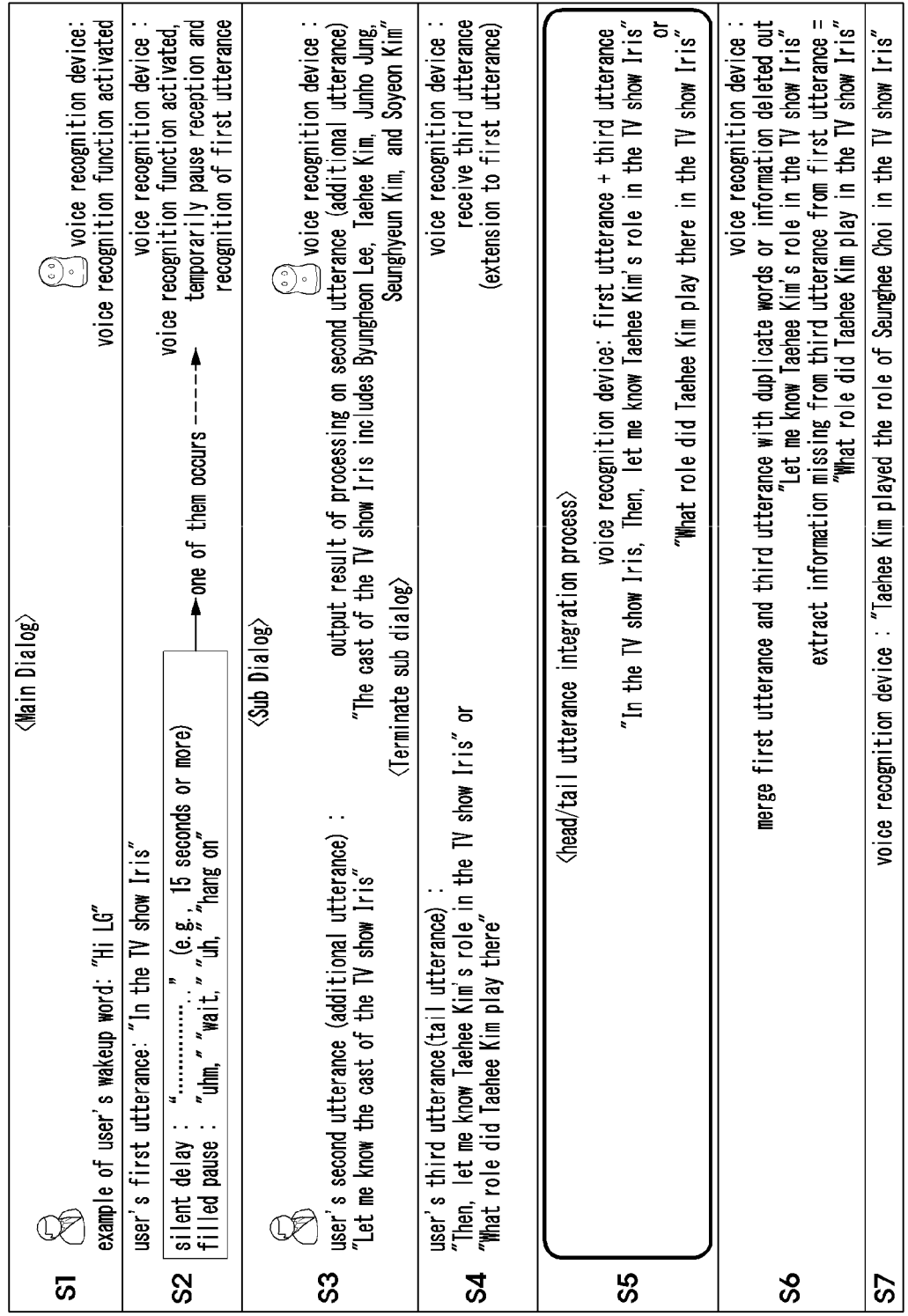
FIG. 11 is a view illustrating an example of recognizing a user's original utterance by a voice recognition device 100 according to an embodiment of the disclosure.

First, in the scenario shown in FIG. 11, the user utters "Hi LG" which is a preset wakeup word in step S1. Here, "Hi LG" is an example wakeup word and other wakeup words may be set by the manager or user. By the user's wakeup word, the voice recognition function of the voice recognition device 100 is activated.

In step S2, the user utters "in the TV show Iris" followed by a silent delay (e.g., for 15 seconds) or utters "in the TV show Iris . . . uhm . . . wait."

Since the user's utterance includes a silent delay or filled pause, the voice recognition device 100 recognizes the voice uttered before the silent delay or filled pause as a first utterance and temporarily stops receiving the first utterance due to the silent delay or filled pause.

Although temporarily stopping receiving the first utterance due to the silent delay or filled pause, the voice recognition device 100 recognizes the first utterance as the original utterance containing the user's original purpose of using the voice recognition device 100. Thus, according to the disclosure, the voice recognition device 100 classifies the first utterance as a main dialog session and maintains the voice recognition function of the voice recognition device 100 in the active state.

Thereafter, in step S3, the user utters "Let me know the cast of the TV sow Iris." The voice recognition device 100 determines that the user's utterance received after the silent delay or filled pause is an additional utterance that is different from the original utterance and recognizes the same as a second utterance.

The second utterance may be a utterance that contains information necessary to complete the first utterance which is the original utterance, or the second utterance may be a utterance that contains information irrelevant to the content or purposes of the first utterance. Thus, according to the disclosure, the voice recognition device 100 classifies the second utterance as a sub dialog session and maintains the voice recognition function of the voice recognition device 100 in the active state.

The voice recognition device 100 outputs "The cast of the TV show Iris includes Byungheon Lee, Taehee Kim, Junho Jung, Seunghyun Choi, and Soyeon Kim" as the result of voice recognition processing on the second utterance "Let me know the cast of the TV show Iris" using the second processing unit which is in charge of voice recognition processing on the sub dialog session.

The voice recognition device 100, after outputting the result of voice recognition processing on the second utterance, may terminate the sub dialog session.

Thereafter, in step S4, the user utters "Then, Let me know Taehee Kim's role in the TV show Iris" or "What role did Taehee Kim play there."

The voice recognition device 100 recognizes the user's utterance received after outputting the result of voice recognition processing on the second utterance as a third utterance and determines that the third utterance is an extension to the first utterance. Thus, the voice recognition device 100 classifies the third utterance as a utterance included in the main dialog session and recognizes the same, together with the first utterance, as a utterance containing the user's purpose of using the voice recognition device 100.

Thereafter, in step S5, the voice recognition device 100 merges or combines the first utterance and the third utterance which is recognized as an extension to the first utterance so as to complete the user's original utterance using the fourth processing unit 1540.

In this step, if the third utterance is "Then, let me know Taehee Kim's role in the TV show Iris," the fourth processing unit 1540 merges or combines the first utterance and the third utterance, generating the fourth utterance "In the TV show Iris, Then, let me know Taehee Kim's role in the TV show Iris." If the third utterance is "What role did Taehee Kim play there," the fourth processing unit 1540 generates the fourth utterance "In the TV show Iris, what role did Taehee Kim play there."

Of the two fourth utterances, the first one contains the duplicate phrases "in the TV show Iris," and the second one includes the adverb "there" which indicates the "TV show Iris."

Thus, the voice recognition device 100 may have difficulty in precisely figuring out the object in the generated fourth utterance and has a high chance of causing an voice recognition error in the fourth utterance.

To address this, in step S6, the voice recognition device 100 modifies the fourth utterance, which is generated simply by merging or combining, to comply with the user's intent to thereby generate a user voice command using the intent classifying unit 1560 and the dialog management unit 1570.

In step S6, the voice recognition device 100 first grasps the intent of the third utterance via the intent classifying unit 1560. The intent classifying unit 1560 extracts the name entity "Taehee Kim" and the first information "in the TV show" and "role" from the third utterance and applies them to the slots of the intent classification table 1561 of FIG. 8. Since 'actor part' among the plurality of intent items have slots for roles or actor names and titles of movies or TV shows, the name entity "Taehee Kim" and the first information "in the TV show" and "role" are inserted to the slots of 'actor part.' If the slots of 'actor part' are filled up, the intent classifying unit 1560 may be aware that the intent of the third utterance is 'actor part.'

The dialog management unit 1570 identifies how many times the name entity and first information are used in the fourth utterance so as to extract the intent 'actor part.'

If the fourth utterance is "In the TV show Iris, Then, let me know Taehee Kim's role in the TV show Iris," the dialog management unit 1570 recognizes that information for the actor or information for the role each have been shown once, but the title of TV show twice in the fourth utterance. The dialog management unit 1570 modifies the fourth utterance so that the duplicate information is shown only once, generating a user voice command, e.g., "Let me know Taehee Kim's role in the TV show Iris."

Thereafter, in step S7, the voice recognition device 100 recognizes the user voice command "Let me know Taehee Kim's role in the TV show Iris" and, as a result of voice recognition processing thereon, outputs "Taehee Kim played the role of Seunghee Choi in the TV show Iris."

If the fourth utterance is "Let me know Taehee Kim's role there in the TV show Iris," the dialog management unit 1570 recognizes that the title of TV show, actor, or role has been shown only once and the adverb "there" which is unclear of what it indicates is present in the fourth utterance. The dialog management unit 1570 modifies the fourth utterance by deleting out the adverb, generating a user voice command, e.g., "Let me know Taehee Kim's role in the TV show Iris."

Then, in step S7, the voice recognition device 100 recognizes the user voice command "Let me know Taehee Kim's role in the TV show Iris" and, as a result of voice recognition processing thereon, outputs "Taehee Kim played the role of Seunghee Choi in the TV show Iris."

According to the disclosure, the voice recognition device 100 may allow the voice recognition processing unit 150 and/or controller 170 to measure filled pauses and duration of silent delays, thereby learning what filled pauses are primarily used per user or how long each silent delay lasts, with a deep neural network. Thus, it is possible to more precisely grasp filled pause or silent delay patterns per user.

The above-described embodiments of the disclosure may be implemented in code that a computer may read out of a recording medium. The computer-readable recording medium includes all types of recording devices storing data readable by a computer system. Examples of the computer-readable recording medium include hard disk drives (HDDs), solid state disks (SSDs), silicon disk drives (SDDs), read-only memories (ROMs), random access memories (RAMs), CD-ROMs, magnetic tapes, floppy disks, or optical data storage devices, or carrier wave-type implementations (e.g., transmissions over the Internet). Thus, the above description should be interpreted not as limiting in all aspects but as exemplary. The scope of the disclosure should be determined by reasonable interpretations of the appended claims and all equivalents of the disclosure belong to the scope of the disclosure.

What is claimed is:

1. A method of controlling a voice recognition device, the method comprising:
   determining, by a processor of the voice recognition device, to temporarily pause reception of a first utterance while receiving the first utterance;
   outputting, by the processor, a result of voice recognition processing on a second utterance received after a temporary pause of the reception of the first utterance;
   determining, by the processor, an intent of a third utterance received after outputting the result of the voice recognition processing on the second utterance;
   generating, by the processor, a user voice command based on the intent of the third utterance and the first utterance;
   inputting, by the processor, the voice command to an artificial neural network and performing voice recognition processing on the user voice command generated based on an output of the artificial neural network to generate a result;
   training, by the processor, the artificial neural network based on the result of the voice recognition processing to generate an updated artificial neural network;
   storing, in a memory of the voice recognition device, the updated artificial neural network;
   transmitting, by a communication interface in the voice recognition device, the updated neural network to an external device; and
   outputting, by the processor, the result of the voice recognition processing on the user voice command.

2. The method of claim 1, wherein
   the determining, by the processor, the intent of the third utterance includes:
   extracting, by the processor, a name entity and first information related to the intent of the third utterance from the third utterance; and
   inserting, by the processor, the name entity and the first information to slots included in an intent classification table,
   wherein the slots are associated with a plurality of intent items included in the intent classification table.

3. The method of claim 2, further comprising:
   after the inserting the name entity and the first information to the slots, determining, by the processor, whether there is an intent item in which a minimum number of slots for determining an intent have been filled among the intent items.

4. The method of claim 3, wherein
   the determining, by the processor, whether there is the intent item in which the minimum number of slots have been filled includes:
   if there is no intent item in which the minimum number of slots have been filled, extracting, by the processor, the name entity and second information related to an intent of the first utterance from the first utterance; and
   inserting, by the processor, the name entity and the second information to the slots included in the intent classification table.

5. The method of claim 4, wherein
   the extracting, by the processor, the name entity and the second information related to the intent of the first utterance includes, upon failing to extract the name entity and the second information from the first utterance, requesting, by the processor, a user to provide the name entity and the second information.

6. The method of claim 3, wherein
   the determining, by the processor, whether there is the intent item in which the minimum number of slots have been filled includes, if there is at least one intent item in which the minimum number of slots have been filled, determining, by the processor, the intent item in which the minimum number of slots have been filled as the intent of the third utterance.

7. The method of claim 1, wherein
   the determining, by the processor, to temporarily pause the reception of the first utterance includes:
   determining, by the processor, whether the first utterance includes a filled pause including a non-linguistical element;
   if the filled pause is included in the first utterance, recognizing, by the processor, the filled pause as a temporary pause signal for pausing the reception of the first utterance; and
   temporarily pausing the reception of the first utterance.

8. The method of claim 7, wherein
   the determining, by the processor, whether the first utterance includes the filled pause includes:
   recognizing, by the processor, one or more words from the first utterance; and
   performing, by the processor, a comparison as to whether the one or more words are identical or similar to words in a pre-owned filled pause dictionary.

9. The method of claim 1, wherein
   the determining, by the processor, to temporarily pause the reception of the first utterance includes:
   when a silent delay occurs during a preset time while receiving the first utterance, temporarily pausing, by the processor, the reception of the first utterance.

10. The method of claim 1, wherein
    the determining, by the processor, to temporarily pause the reception of the first utterance includes:
    determining, by the processor, whether the first utterance includes a preset temporary pause determination-purpose keyword; and
    if the temporary pause determination-purpose keyword is included in the first utterance, temporarily pausing, by the processor, the reception of the first utterance.

11. The method of claim 1, wherein
    the determining, by the processor, to temporarily pause reception of the first utterance includes:
    if reception of the first utterance is temporarily paused, waiting, by the processor, for voice recognition processing on the first utterance received before the temporary pause.

12. The method of claim 1, further comprising receiving, by the processor, a wakeup word before the receiving the first utterance and initiating a voice recognition active state.

13. A voice recognition device, comprising:
    an output part configured to output visual information or audio information;
    a memory configured to store an artificial neural network;
    a communication interface configured to communicate with an external device;
    a processor configured to:
    determine to temporarily pause reception of a first utterance while receiving the first utterance;
    output, via the output part, a result of voice recognition processing on a second utterance received after a temporary pause of the reception of the first utterance;
    extract a name entity from a third utterance received after outputting the result of the voice recognition processing on the second utterance, determine a common intent for the first utterance and the third utterance, and generate a user voice command based on the common intent;

input the voice command to an artificial neural network for performing voice recognition processing on the user voice command generated based on an output of the artificial neural network to generate a result; and train the artificial neural network based on the result of the voice recognition processing to generate an updated artificial neural network;

store, in the memory of the voice recognition device, the updated artificial neural network;

transmit, by the communication interface in the voice recognition device, the updated neural network to the external device; and output, via the output part, the result of the voice recognition processing on the user voice command, wherein the common intent is determined based on an intent classification table including a plurality of items and slots associated with the plurality of items.

14. The voice recognition device of claim 13, wherein the processor is further configured to:

in response to the first utterance including a filled pause which is a non-linguistical element, recognize the filled pause as a signal for temporarily pausing the reception of the first utterance and temporarily pause the reception of the first utterance.

15. The voice recognition device of claim 13, wherein the processor is further configured to:

receive a wakeup word before receiving the first utterance and switch the voice recognition device into an active mode.

16. The voice recognition device of claim 15, wherein the processor is further configured to:

after outputting the result of the voice recognition processing on the second utterance, maintain the active mode of the voice recognition device.

17. The voice recognition device of claim 13, wherein the processor is further configured to:

extract the name entity first from the third utterance, and upon failing to extract the name entity from the third utterance, extract the name entity from the first utterance.

18. The method of claim 17, wherein the processor is further configured to:

insert at least one or more of the name entity, first information for an intent of the third utterance and second information for an intent of the first utterance to the slots, in response to the first information being present, insert the first information to the slots, and in response to the first information being absent, insert the second information to the slots.

19. The voice recognition device of claim 13, wherein the processor is further configured to:

recognize one or more words from the first utterance, compare the one or more words with words in a pre-owned filled pause dictionary, and in response to the one or more words being identical or similar to the words in the filled pause dictionary, temporarily pause the reception of the first utterance.

20. The voice recognition device of claim 13, wherein the processor is further configured to:

in response to a silent delay occurring during a preset time while receiving the first utterance, temporarily pause the reception of the first utterance.

21. The voice recognition device of claim 13, wherein the processor is further configured to:

in response to a preset temporary pause determination-purpose keyword being present in the first utterance, temporarily pause the reception of the first utterance.

22. The voice recognition device of claim 13, wherein the processor is further configured to:

in response to the reception of the first utterance being temporarily paused, wait for voice recognition processing on the first utterance received before the temporary pause.

* * * * *